United States Patent [19]

Nishina et al.

[11] Patent Number: 5,967,941

[45] Date of Patent: Oct. 19, 1999

[54] CONTROL SYSTEM FOR AUTOMATIC VEHICLE TRANSMISSION

[75] Inventors: Masatoshi Nishina; Masatoshi Shimizu; Koichi Hasegawa; Takehiro Katakura; Hiroyuki Katano, all of Wako, Japan

[73] Assignee: Honda Giken Kogyo Kabushiki Kaisha, Tokyo, Japan

[21] Appl. No.: 09/140,667

[22] Filed: Aug. 26, 1998

[30] Foreign Application Priority Data

Sep. 2, 1997 [JP] Japan .................................... 9-251424

[51] Int. Cl.$^6$ .................................................. F16H 61/00
[52] U.S. Cl. .............................................. 477/115; 477/99
[58] Field of Search ....................................... 477/99, 115

[56] References Cited

U.S. PATENT DOCUMENTS 5,778,330  7/1998  McKee ....................................... 477/99

FOREIGN PATENT DOCUMENTS 4-248059  9/1992  Japan .

*Primary Examiner*—Dirk Wright
*Attorney, Agent, or Firm*—Armstrong, Westerman, Hattori, McLeland & Naughton

[57] ABSTRACT

A system for controlling an automatic transmission mounted on a vehicle, including a gear system and hydraulic clutches which hold a member of the gear system stationary to produce gear reduction or reverse to transmit engine output, and a linear solenoid valve provided in the oil line which generates an oil pressure to be supplied to hydraulic clutches in response to a current supplied thereto. In the system, the current supply is initiated when the ignition switch is turned to the ON position where the engine is not started, producing a noise due to the solenoid valve operation. In order to avoid this, the current is limited to a predetermined value when the engine is not started and the vehicle is stopped. Moreover, since the predetermined value is slightly above the current at which the clutch pressure begins to rise, the automatic transmission can start its operation quickly when the engine is started.

9 Claims, 3 Drawing Sheets

CONTROL SYSTEM FOR AUTOMATIC VEHICLE TRANSMISSION

BACKGROUND OF THE INVENTION

1. Field of the Invention

This invention relates to a control system for an automatic vehicle transmission, particularly to a control system for controlling the current supply to an actuator such as a solenoid valve when the engine and the vehicle are stopped.

2. Description of the Related Art

Automatic vehicle transmissions are commonly shifted by using linear solenoid valves (actuators) to operate hydraulic clutches. A technology for this is taught, for example, by Japanese Patent Publication No. Hei 5(1993)-17,430. Upon being supplied with current, the linear solenoid valve supplies the hydraulic clutch with hydraulic pressure proportional to the magnitude of the supplied current so as to engage the hydraulic clutch and shift gears.

In an ordinary vehicular engine, the ignition switch has an OFF position, an ACC position on which on-board audio devices, etc., operate, an ON position on which other devices such as a window motor, air conditioners operate and a START position on which the engine starter motor operates to start the engine. When the ignition switch is turns from the OFF position to the ON position, the current supply to the linear solenoid valve is started before the engine crankshaft begins to rotate.

Since the engine has not started, no oil (automatic transmission fluid or ATF) is supplied to the linear solenoid valve at this instance. Nevertheless, the valve plunger begins to move freely in response to the current supply to produce a noise due to the operation, thereby disadvantageously degrading the silence or quiet in the passenger room. When the engine starts, it supplies oil to the solenoid valve and the noise is canceled by a dampening effect of the oil.

Thus, for example, when the driver turns the ignition switch from the OFF position to the ON position to open an electrically-controlled window, the current supply to the solenoid produces a noise which may be annoying to the driver. In such a case it would be preferable to delay the energization of the solenoids while, on the other hand, the automatic transmission should preferably initiate its operation quickly when the ignition switch is further turned to the START position.

SUMMARY OF THE INVENTION

An object of this invention is therefore to overcome these shortcomings of the prior art by providing a control system for an automatic vehicle transmission which can optimally balance between the decrease of the noise due to the actuator operation before engine starting and assurance of quick starting of the automatic transmission operation after engine starting.

This invention achieves this object by providing a system for controlling an automatic transmission mounted on a vehicle, including a gear system and hydraulically actuated engaging elements which hold a member of the gear system stationary to produce gear reduction or reverse to transmit output of an engine mounted on the vehicle to a drive shaft, comprising an oil line which connects the engaging elements to an oil pressure source, an actuator provided in the oil line which generates an oil pressure to be supplied to one of the engaging elements in response to a current supplied thereto, current supply means for supplying the current to the actuator, engine operation determining means for determining whether a crankshaft of the engine is not rotating, vehicle operation determining means for determining whether the vehicle is stopped, and supply current limiting means for limiting the current to be supplied to the actuator to a predetermined value when it is determined that the crank shaft of the engine is not rotating and the vehicle is stopped.

BRIEF EXPLANATION OF THE DRAWINGS

This and other objects and advantages of the invention will be more apparent from the following description and drawings, in which.

DETAILED DESCRIPTION OF THE PREFERRED EMBODIMENT

An embodiment of the invention will now be explained with reference to the attached drawings.

Figure 1:
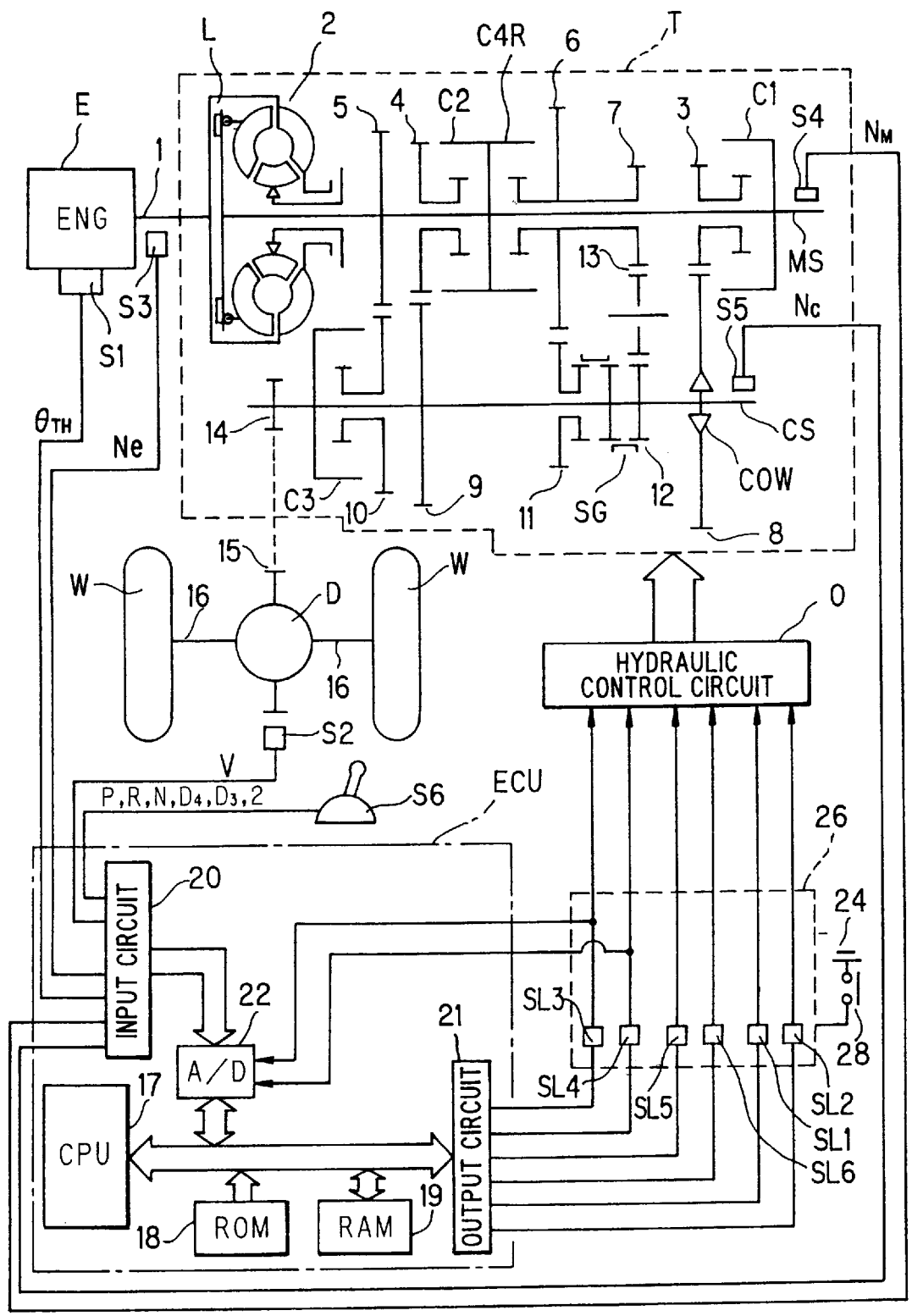
FIG. 1 is an overall schematic view of a control system for an automatic vehicle transmission.

FIG. 1 is an overall schematic view of a control system for an automatic vehicle transmission according to the invention.

As shown in FIG. 1, an automatic vehicle transmission T is equipped with a main shaft MS connected to the crankshaft 1 of an internal combustion engine E through a torque converter 2 having a lockup mechanism L and with a countershaft CS connected to the main shaft MS through multiple gear trains.

The main shaft MS supports a main first-speed gear 3, a main second-speed gear 4, a main third-speed gear 5, a main fourth-speed gear 6 and a main reverse gear 7. The countershaft CS supports a counter first-speed gear 8 engaged with the main first-speed gear 3, a counter second-speed gear 9 engaged with the main second-speed gear 4, a counter third-speed gear 10 engaged with the main third-speed gear 5, a counter fourth-speed gear 11 engaged with the main fourth-speed gear 6 and a counter reverse gear 12 engaged with the main reverse gear 7 through a reverse idle gear 13.

The first-speed (1st gear) is established when the main first-speed gear 3 rotatably supported on the main shaft MS is connected with the main shaft MS by a first-speed hydraulic clutch C1. Since the first-speed hydraulic clutch C1 is also maintained in the engaged state during establishment of the second to fourth speeds, the counter first-speed gear 8 is supported by a one-way clutch COW.

The second-speed (2nd gear) is established when the main second-speed gear 4, rotatably supported on the main shaft MS, is connected with the main shaft MS by a second-speed hydraulic clutch C2.

The third-speed (3rd gear) is established when the counter third-speed gear 10, rotatably supported on countershaft CS, is connected with the countershaft CS by a third-speed hydraulic clutch C3.

The fourth-speed (4th gear) is established when the counter fourth-speed gear 11, rotatably supported on the countershaft CS, is connected with the countershaft CS by a selector gear SG and with this state maintained the main fourth-speed gear 6, rotatably supported on the main shaft MS, is connected with the main shaft MS by a fourth-speed/reverse hydraulic clutch C4R.

The reverse-speed (reverse gear) is established when the counter reverse gear 12 rotatably supported on the countershaft CS is connected with the countershaft CS by the selector gear SG and with this state maintained the main reverse gear 7 rotatably supported on the main shaft MS is connected with the main shaft MS by the fourth-speed/reverse hydraulic clutch C4R. The clutches C1, C2, C3 and C4R are the frictional engaging elements.

The rotation of the countershaft CS is transmitted through a final drive gear 14 and a final driven gear 15 to a differential D, from where it is transmitted to driven wheels W, W through left and right drive shafts 16, 16 of the vehicle (not shown) equipped with the engine E and the automatic vehicle transmission T.

A throttle position sensor S1 is provided in the vicinity of a throttle valve (not shown) located in the air intake pipe (not shown) of the engine E. The throttle position sensor S1 outputs a signal indicative of the degree of opening θ TH of the throttle valve. A vehicle speed sensor S2 provided in the vicinity of the final driven gear 15 outputs a signal once every rotation of the final driven gear 15. A crank angle sensor S3 is further provided in the vicinity of a camshaft (not shown) for outputting a CYL signal at a prescribed crank angle of a prescribed cylinder, a TDC signal at a prescribed crank angle of every cylinder, and a CRK signal once every subdivision of the prescribed crank angle (e.g., 15 degrees).

An input shaft rotational speed sensor S4 is provided in the vicinity of the main shaft MS for outputting a signal once every rotation of the main shaft MS. An output shaft rotational speed sensor S5 is provided in the vicinity of the countershaft CS for outputting a signal once every rotation of the countershaft CS. A shift lever position sensor S6 is provided in the vicinity of a shift lever installed on the vehicle floor near the driver's seat. The shift lever position sensor S6 outputs a signal indicating the position selected by the driver among the six positions (ranges) P, R, N, D4, D3 and 2.

The outputs of the sensors S1 etc. are sent to an ECU (electronic control unit).

The ECU is constituted as a microcomputer comprising a CPU (central processing unit) 17, a ROM (read-only memory) 18, a RAM (random access memory) 19, an input circuit 20 and an output circuit 21. The microcomputer is also equipped with an A-D converter 22.

The outputs of the sensors S1 etc. are input to the microcomputer through the input circuit 20 and converted from analog values to digital values by the A-D converter 22. The digital signals are processed by a wave-shaping circuit and other processing circuits (not shown) and stored in the RAM 19.

The output of the vehicle speed sensor S2 and the CRK signal output of the crank angle sensor S3 are counted by counters (not shown) to ascertain the vehicle speed V and the speed of the internal combustion engine E. The outputs of the input shaft rotational speed sensor S4 and the output shaft rotational speed sensor S5 are counted to ascertain the rotational speed NM of the transmission input shaft and the rotational speed NC of the transmission output shaft. The CPU 17 has 8/16-bit capacity (8-bit external bus, 16-bit internal bus).

The CPU 17 of the microcomputer determines the appropriate gear (speed) and energizes or deenergizes the shift solenoids SL1, SL2, via the output circuit 21 and a voltage supply and current detection circuit 26 connected to an electric power source (battery) 24 of 12 V or thereabout, to control the shift valves (neither shown) of a hydraulic control circuit O, so as to disengage or engage the hydraulic clutches Cn corresponding to the current gear and the next gear.

During this gear shifting, the CPU 17 energizes or deenergizes the linear solenoids SL3, SL4 via the voltage supply and current detection circuit 26 so as to control or variably regulate the oil pressure supplied to the hydraulic clutches Cn. Similarly, the CPU 17 energizes or deenergizes solenoid SL5 (for on/off control) and linear solenoid SL6 (for capacity control) of the lockup mechanism L of the torque converter 2 via the circuit 26.

The structure of the hydraulic control circuit O is described in detail in the assignee's earlier Japanese Patent Application No. Hei 8(1996)-253,633 etc. and will not be explained further here.

As illustrated in FIG. 1, an ignition switch 28 is provided in the electric circuit between the electric power source (battery) 24 and the voltage supply and current detection circuit 26. The ignition switch 28 has an OFF position, an ACC position on which on-board audio devices, etc., not shown, operate, the ON position on which other devices such as a window motor, air conditioners operate (neither shown) and the START position on which the engine starter motor (not shown) operates to start the engine. The electric power is supplied to the circuit 26 from the source 24 when the ignition switch 28 turns from the OFF position to one of the ACC, ON or START positions. The current supply begins when the ignition switch is turned to the ON position wherein the engine E is not started.

The ECU samples the current supplied to the linear solenoids through A-D conversion and controls the current in a closed fashion such that the error between the detected value and a desired value decreases.

The control will now be explained taking those for the linear solenoids SL3, SL4 as example.

Figure 2:
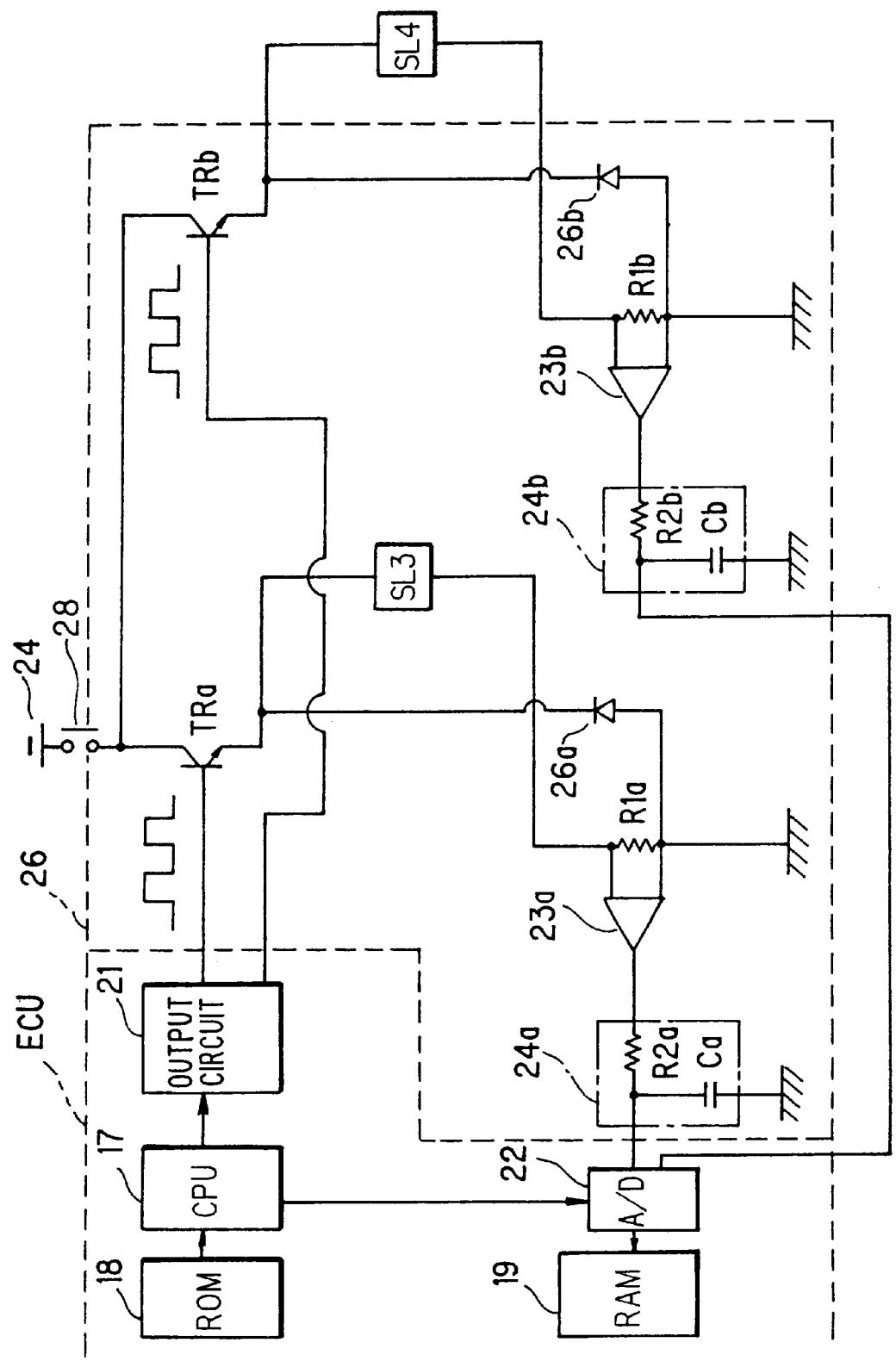
FIG. 2 is a circuit diagram showing a voltage supply and current detection circuit illustrated in FIG. 1.

FIG. 2 is a circuit diagram illustrating the aforesaid voltage supply and current detection circuit 26 in detail.

The CPU 17 determines voltage commands in pulse train (in terms of the duty-ratio in PWM) to be supplied to the linear solenoids SL3, SL4 in a routine (not shown) in accordance with the instructions stored in the ROM 18, and provides the same to the bases of the NPN transistors TRa, TRb through the output circuit 21.

The transistors TRa, TRb are connected to the electric power source (battery) 24 through the collectors. The transistors turn ON in response to the rising edge in the pulse trains to cause current to flow from the battery 24 to the linear solenoids SL3, SL4. The current paths have resistors R1$a$, R1$b$ downstream of the solenoids SL3, SL4. The voltages across the resistors (proportional to the current supplied) are detected and input to operational amplifiers 23$a$, 23$b$ which amplify the inputs.

The outputs of the operational amplifiers 23$a$, 23$b$ are forwarded to the A-D converter 22 via filter circuits 24$a$, 24$b$ (for removing noises) each having a resistor R2$a$ or R2$b$ and a capacitor Ca or Cb. The CPU 17 drives the A-D converter 22 at predetermined timings to convert the inputs to digital values which in turn are sent to the RAM 19 at predetermined timings. The CPU 17 converts the input digital data to currents values and if necessary, corrects the commands using an appropriate feedback gain such that the error between the detected values and desired values decreases. In FIG. 2, reference numerals 26$a$, 26$b$ indicate flywheel diodes for preventing the reverse current flow.

The operation of the control system for an automatic vehicle transmission according to the invention will now be explained.

Figure 3:
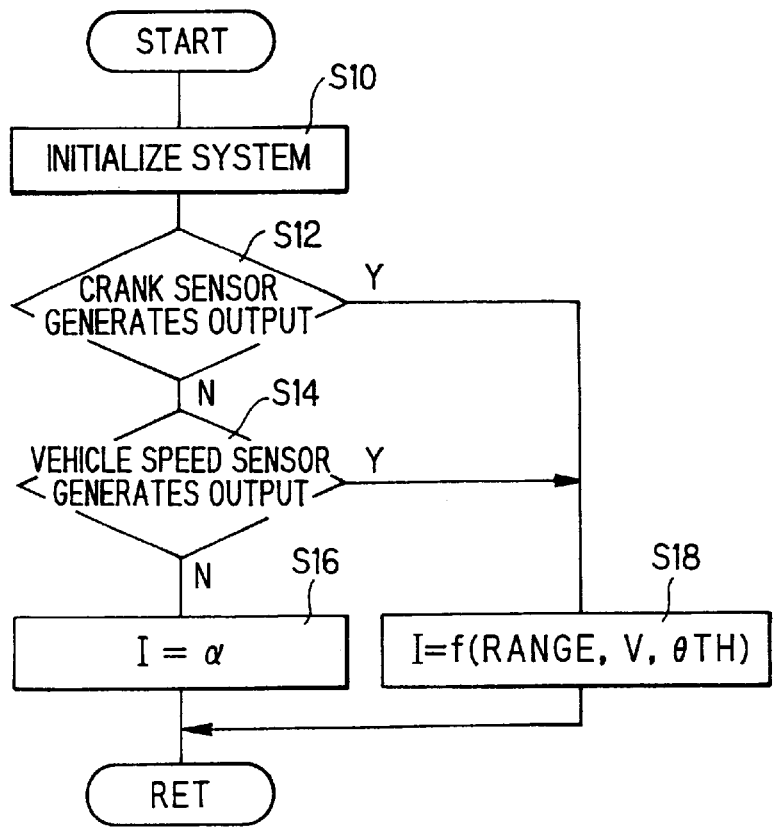
FIG. 3 is a flow chart showing the operation of the system illustrated in FIG. 1.

FIG. 3 is a flow chart of the system operation. This program is executed at regular intervals when the ignition switch 28 is turned to the ON position.

The program starts at S10, in which the system is initialized, and proceeds to S12 in which it is determined whether the crank angle sensor S3 generates the output, more precisely the CRK signal. Specifically, it is determined whether the engine crankshaft is rotating or not, more simply whether the engine E has been started or nt.

When the result is negative, the program proceeds to S14 in which it is determined whether the vehicle speed sensor S2 generates the output. More specifically, it is determined whether the vehicle is not stopped. When the result is negative, the program proceeds to S16 in which the current I to be supplied to the linear solenoids SL3, SL4 is limited to a predetermined standby current α.

Figure 4:
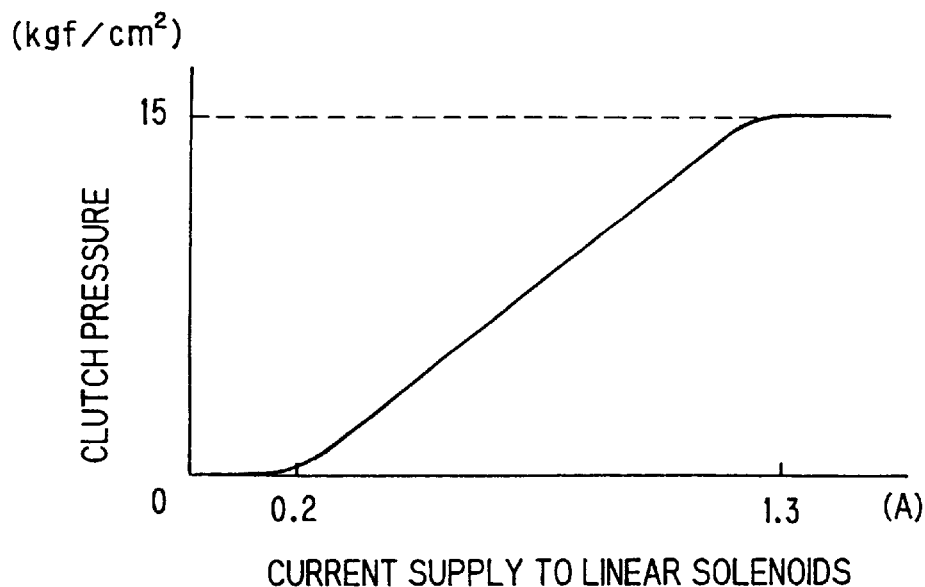
FIG. 4 is an explanatory graph showing the characteristics of clutch (oil) pressure corresponding to or relative to the current supply to the linear solenoid valves (actuators).

FIG. 4 is an explanatory graph showing the characteristics of the clutch oil pressure relative to or corresponding to the current supply to the linear solenoids SL3, SL4. The clutch oil pressure begins to rise at a point corresponding to a current of 0.17A or thereabout and saturates at a point corresponding to 1.3A.

The standby current α is accordingly determined to be a value, for example 0.2A, which is slightly above the current 0.17A at which the clutch pressure begins to rise. At this standby current, the noise due to the operation of the solenoid valves is small, thereby allowing the passenger room to remain relatively quiet. At the same time, since the standby current exceeds the current at which the clutch pressure begins to rise, the transmission can start its operation quickly when the engine has been started.

On the other hand, when the result in S12 or S14 is negative, the program proceeds to S18 in which the current I to be supplied to the linear solenoids SL3, SL4 are determined in the manner described above when the gear-shift is conducted. More specifically, a gear-shift scheduling map is retrieved by the detected vehicle speed V and the throttle opening θTH when the range is the drive range, and the commands to the solenoids are determined in such a manner that the clutch oil pressure for the current gear is gradually decreased with respect to time, while that for the next gear is gradually increased with respect to time so as to effect downshifting or upshifting.

The embodiment is thus configured to have a system for controlling an automatic transmission T mounted on a vehicle, including a gear system and hydraulically actuated engaging elements (hydraulic clutches C1, C2, C3, C4R) which hold a member of the gear system stationary to produce gear reduction or reverse to transmit output of an engine E mounted on the vehicle to a drive shaft 16, comprising an oil line which connects the engaging elements to an oil pressure source, an actuator (linear solenoid valve) provided in the oil line which generates an oil pressure to be supplied to one of the engaging elements in response to a current I supplied thereto (to the linear solenoids SL3, SL4), current supply means (ECU) for supplying the current to the actuator, engine operation determining means (ECU, S12) for determining whether a crankshaft (1) of the engine E is not rotating, vehicle operation determining means (ECU, S14) for determining whether the vehicle is stopped, and supply current limiting means (ECU, S16) for limiting the current I to be supplied to the actuator to a predetermined value (standby current α, i.e., 0.2A) when it is determined that the crank shaft of the engine is not rotating and the vehicle is stopped.

In the system, the predetermined value is slightly above a value (0.17A) at which the oil pressure of said one of the engaging elements begins to rise.

In the system, the engine includes an ignition switch 28 having at least a position (ON position) at which the current is supplied to the actuator, but the engine is not started.

In the system, the engaging elements are hydraulic clutches.

With this arrangement, if, for example, the driver turns the ignition switch from the OFF position to the ON position to open an electrically-controlled window when the engine is not started, the noise due to operation of the solenoid valves (actuators) is decreased and the passenger room is kept relatively quiet. Moreover, when the ignition switch is farther turned to START, the automatic transmission can initiate its operation quickly, since the linear solenoid valves are supplied with the current which is larger than that at which the clutch pressure begins to rise. Thus, this arrangement can optimally balance between the noise decrease and quick initiation of transmission operation.

It should be noted in the above that, although this embodiment supplies the standby current to the linear solenoids SL3, SL4 when the engine is not started and the vehicle is stopped, it is alternatively possible to supply similar currents to other solenoids SL1, SL2, SL5 and SL6.

It should also be noted that, although the invention has been described with reference to the transmission shown in FIG. 1, the invention can instead by applied to a transmission having a planetary gear system.

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. A system for controlling an automatic transmission mounted on a vehicle, including a gear system and hydraulically actuated engaging elements which hold a member of the gear system stationary to produce gear reduction or reverse to transmit output of an engine mounted on the vehicle to a drive shaft, comprising:

an oil line which connects the engaging elements to an oil pressure source;

an actuator provided in the oil line which generates an oil pressure to be supplied to one of the engaging elements in response to a current supplied thereto;

current supply means for supplying the current to the actuator, engine operation determining means for determining whether a crankshaft of the engine is not rotating;

vehicle operation determining means for determining whether the vehicle is stopped; and supply current limiting means for limiting the current to be supplied to the actuator to a predetermined value when it is determined that the crank shaft of the engine is not rotating and the vehicle is stopped.

2. A system according to claim 1, wherein the predetermined value is slightly above a value at which the oil pressure of said one of the engaging elements begins to rise.

3. A system according to claim 1, wherein the engine includes an ignition switch having at least a position at which the current is supplied to the actuator, but the engine is not started.

4. A system according to claim 1, wherein the engaging elements are hydraulic clutches.

5. A method of controlling an automatic transmission mounted on a vehicle, including:
- a gear system and hydraulically activated engaging elements which hold a member of the gear system stationary to produce gear reduction or reverse to transmit output of an engine mounted on the vehicle to a drive shaft;
- an oil line which connects the engaging elements to an oil pressure source;
- an actuator provided in the oil line which generates an oil pressure to be supplied to one of the engaging elements in response to a current supplied thereto; and
- current supply means for supplying the current to the actuator;
- wherein the method comprises the steps of:
  - determining whether a crankshaft of the engine is not rotating;
  - determining whether the vehicle is stopped; and
  - limiting the current to be supplied to the actuator to a predetermined value when it is determined that the crank shaft of the engine is not rotating and the vehicle is stopped.

6. A method according to claim 5, wherein the predetermined value is slightly above a value at which the oil pressure of said one of the engaging elements begins to rise.

7. A method according to claim 5, wherein the engine includes an ignition switch having at least a position at which the current is supplied to the actuator, but the engine is not started.

8. A method according to claim 1, wherein the engaging elements are hydraulic clutches.

9. A computer program embodied on a computer-readable medium for controlling an automatic transmission mounted on a vehicle, including:
- a gear system and hydraulically activated engaging elements which hold a member of the gear system stationary to produce gear reduction or reverse to transmit output of an engine mounted on the vehicle to a drive shaft;
- an oil line which connects the engaging elements to an oil pressure source;
- an actuator provided in the oil line which generates an oil pressure to be supplied to one of the engaging elements in response to a current supplied thereto; and
- current supply means for supplying the current to the actuator;
- wherein the computer program comprises the steps of:
  - determining whether a crankshaft of the engine is not rotating;
  - determining whether the vehicle is stopped; and
  - limiting the current to be supplied to the actuator to a predetermined value when it is determined that the crank shaft of the engine is not rotating and the vehicle is stopped.

* * * * *